United States Patent Office 3,268,289
Patented August 23, 1966

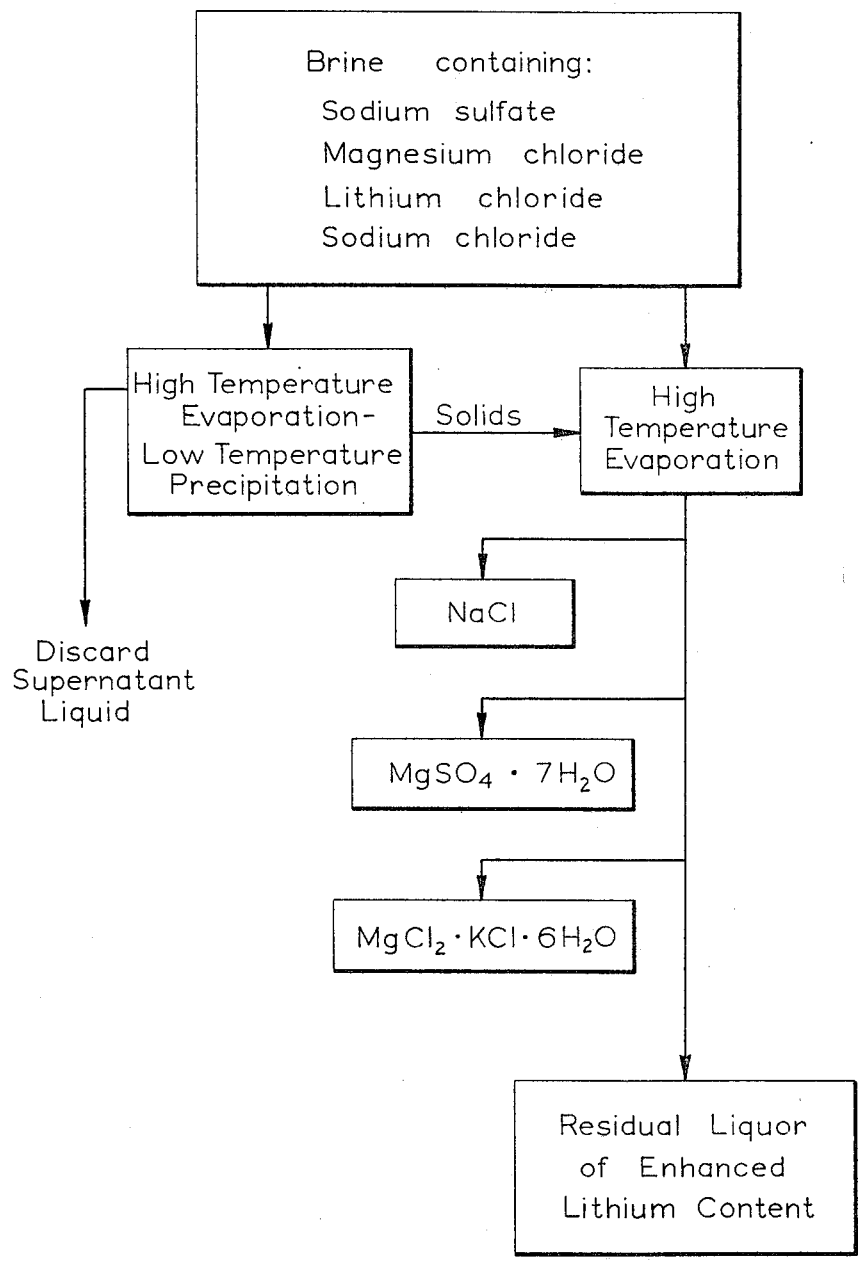

3,268,289
RECOVERY OF LITHIUM FROM BRINES
James G. Macey, Salt Lake City, Utah, assignor to Signal Oil and Gas Company, Los Angeles, Calif., a corporation of Delaware
Filed Dec. 11, 1962, Ser. No. 243,816
5 Claims. (Cl. 23—89)

This invention relates to the economical concentration of brines for the recovery of lithium from brines which contain a relatively small amount of lithium chloride and a relatively large amount of magnesium chloride.

The invention is particularly applicable to brines which also contain a substantial amount of sodium sulfate. Specifically, the invention is applicable to the brine of the Great Salt Lake in Utah which contains about 2.8% magnesium chloride and about 0.027% lithium chloride. The brine also contains about 2.8% sodium sulfate, about 0.9% potassium chloride, and about 19 to 20% sodium chloride.

Lithium chloride is a relatively expensive chemical but it has heretofore not been economical to recover it by evaporative means from Great Salt Lake brine because of its low concentration. If one merely attempts to evaporate the water, a final concentration is reached having about 38% of magnesium chloride and about 0.5% of lithium chloride. Such a concentrate is relatively worthless for lithium recovery because of the large magnesium content and the low lithium content. In accordance with the present invention, by proper pond management it is possible to obtain merely by normal solar evaporation a concentrated brine containing about 35% magnesium chloride and 4.5% of lithium chloride. Since the original ratio of lithium to magnesium was less than 100 to 1 while the final ratio is about 8 to 1, it is obvious that a very worthwhile enhancement of the lithium content has taken place.

It is therefore an object of the present invention to provide a means in the concentration of Great Salt Lake brine to depress the magnesium ion so that magnesium salts go out of solution selectively, leaving the lithium salts in solution in progressively higher ratio as evaporation continues.

The sole figure of the drawing is a flow diagram of a preferred embodiment of the process.

In general, the object of the invention is accomplished by adding sodium sulfate to a solution of Great Salt Lake brine in amounts ranging from half as much sodium sulfate as is there naturally, up to three times as much on a weight percent basis. In accordance with a preferred embodiment of the invention, advantage is taken of the changes in weather to provide the sodium sulfate from the lake itself. This is done by concentrating lake water by solar evaporation in a pond to about ¼ of its starting volume, which causes an increase in the sodium sulfate concentration from 2.5% to 10%. This is preferably done late in the summer while the weather is still warm. During the temperatures which prevail during the summertime, the sodium sulfate stays in solution, but as the weather gets cold, the solubility of the sodium sulfate decreases and it precipitates out as Glauber's salt containing about 85% of the sulfate content of the original lake water. There is little precipitation of the other salts. This deposit is formed as a relatively hard bottom deposit looking much like ice. After the Glauber's salt has been precipitated, the supernatant liquid is returned to the lake as waste. In the following spring, when the weather begins to warm, fresh lake water is brought into the pond whereupon the Glauber's salt readily redissolves so that the net result is that of greatly increasing the total sodium sulfate content of the water. The enhanced sodium sulfate content of the water gives a ready means for the disposal of the unwanted magnesium ion. In the drawing, a transfer of solids from one pond to another is shown. However, this is merely by way of diagrammatic representation and, in actual practice, lake water is drawn into a pond which has a deposit of sodium sulfate on the bottom from a prior high temperature evaporation and low temperature decanting step.

There are two routes by which magnesium can be removed, one of which involves forming the double salt with potassium chloride known as carnallite. This removes a relatively small amount of the magnesium and the balance of the magnesium is removed by forming magnesium sulfate. This is accomplished in the present invention, as has been pointed out above, by the natural concentration of the sodium sulfate during cold weather which later reacts with the magnesium chloride to form magnesium sulfate.

Thus, lake water is pumped in on top of the prior deposited sodium sulfate. The sodium sulfate is about 98% pure and the ratio of the lake water is such that from ½ to 3 times the amount of the concentration of magnesium chloride is added on a molar basis. The lake water which has thus been enhanced in sodium sulfate content is permitted to evaporate at relatively high summer temperatures. First there is crystallized from the solution sodium chloride. Next magnesium sulfate precipitates from the water, followed by the precipitation of carnallite. Evaporation is continued until the volume of the lake water is about 1/500 of its former volume. At this point, the concentration has been increased so that the magnesium chloride content is now about 32%, the lithium chloride content as high as 14% plus, and the sodium chloride content about .30%. Thus, the magnesium chloride content has been increased a little over 10 times while the lithium chloride content has been increased about 500 times. This brine can then be processed in various ways such as an electrolytic cell to remove the magnesium or by oxidizing the magnesium to magnesium oxide. The exact method of further processing the residual liquor forms no part of the present invention and is merely given by way of example.

The following non-limiting example illustrates a practical embodiment of the invention:

Yield:                                                    Tons
    Net yield lithium chloride recovered per
      year _____ 1,000
        In plant losses _____ 200
        In pond losses _____ 800

Gross lithium chloride to ponds in Lake water
      contained in 4,520 acre feet Lake water; at
      24" season depth, required 2,260 acres
      of ponds _____ 2,000

Pond system: Acres
- Pond 1 _____ 1,130
- Pond 2 _____ 565
- Pond 3 _____ 249
- Pond 4 _____ 249
- Pond 5 _____ 67

Operation:

Pump to Pond 1 by April 1st—
- Flow continuously from Pond 1 to Pond 2 and empty Pond 1 by June 20 _____ [1] 7,400,000
- Pump from Pond 2 to Pond 3 by July 20 _____ [2] 925,000
- (As evaporation proceeds, pump successively to Pond 4 and to Pond 5, recovering final bittern from Pond 5 about August 15th.)
- Pump to Pond 1 on June 20 [3] ____ [1] 6,600,000
- Pump to Pond 2 on July 20 [3] ____ [1] 2,650,000
- Transfer from Pond 2 to Pond 1 by Sept. 15 remaining solution ____ [2] 700,000
- Empty to waste from Pond 1 in coldest weather all solution ____ [2] 2,400,000

[1] Tons Lake water.
[2] Tons solution.
[3] Amount based on 80% retention in Pond 1 of total sulfate in Lake water pumped to Pond 1 on June 20 and Pond 2 on July 20.

By high and low temperatures, I refer to the temperatures prevailing in the vicinity of Great Salt Lake. Thus, the sodium sulfate would normally be precipitated at a temperature of 0° F. or lower, while the evaporation steps would take place at temperatures of 50° F. or higher.

I claim:

1. In the processing of a natural brine by evaporation, said brine containing sodium sulfate, magnesium chloride and lithium chloride, the process comprising dividing said brine into first and second portions and evaporating the first portion and cooling the thus concentrated first portion whereby there is precipitated sodium sulfate therefrom, discarding the supernatant liquid from the first portion, adding the second portion to the thus precipitated sodium sulfate whereby the sodium sulfate content of the second portion is increased, and evaporating said brine whereby magnesium sulfate is precipitated from the brine, leaving a residual liquor of enhanced lithium chloride content.

2. In the processing of a brine containing about 2.8% of magnesium chloride, about 0.027% lithium chloride and about 2.8% sodium sulfate, the steps of evaporating a portion of said brine to about ¼ of its former volume, cooling said brine whereby most of said sodium sulfate precipitates out, removing the supernatant liquid from said precipitated sodium sulfate, adding a fresh brine of the above composition to said sodium sulfate, and evaporating said brine whereby there is selectively precipitated from the brine magnesium sulfate, producing a residual liquor of enhanced lithium chloride content.

3. The process of claim 1 wherein from one-half to three times as much sodium sulfate is present in the brine after its addition to the precipitated sodium sulfate, on a molar basis as the magnesium chloride content.

4. In the processing of a natural brine by evaporation for recovery of lithium, wherein said brine contains sodium sulfate, magnesium chloride and lithium chloride and wherein the magnesium chloride concentration is substantially greater than the lithium chloride concentration, the improvement comprising separately evaporating at at least about 50° F. and cooling at not more than about 0° F. a portion of said brine until a major proportion of the sodium sulfate therein is selectively precipitated therefrom as Glauber's salt which amount is sufficient, when added to the remainder of said brine, to precipitate a sufficient portion of said magnesium in said remainder as magnesium sulfate upon concentration and evaporation of said brine, so as to materially lower the concentration ratio of magnesium ion to lithium ion in that brine, discarding the supernatant liquid from the portion of said brine wherefrom said sodium sulfate has been precipitated, contacting said remainder of said brine with said precipitated sodium sulfate and dissolving said sodium sulfate therein by increasing the temperature of said brine and thereafter evaporating said remainder of said brine until a substantial portion of said magnesium in said remainder selectively precipitates therefrom as magnesium sulfate, thereafter recovering a residual liquor from said remainder having an increased concentration ratio of lithium ion to magnesium ion.

5. The improvement in accordance with claim 4 wherein at least about 80 percent, by weight, of the sodium sulfate in said portion is precipitated therefrom, and wherein said evaporation of said remainder after contacting with said sodium sulfate is carried out until said magnesium in said remainder is precipitated therefrom as magnesium sulfate and carnallite and until the residual liquor contains about 32 percent, by weight, of magnesium chloride and about 14 percent, by weight, of lithium chloride.

References Cited by the Examiner

UNITED STATES PATENTS

| | | | |
|---|---|---|---|
| 1,977,648 | 10/1934 | Sessions | 23—38 X |
| 2,753,242 | 7/1956 | Davis | 23—89 X |
| 2,764,472 | 9/1956 | Cody et al. | 23—89 X |
| 2,964,381 | 12/1960 | Goodenough | 23—38 X |

OTHER REFERENCES

McPherson and Henderson book, "A Course in General Chemistry," third edition 1927, p. 514. Ginn & Co., N.Y.

OSCAR R. VERTIZ, *Primary Examiner.*

MAURICE A. BRINDISI, *Examiner.*

E. STERN, *Assistant Examiner.*